United States Patent [19]
Wai et al.

[11] Patent Number: 4,869,750
[45] Date of Patent: Sep. 26, 1989

[54] LIQUID METAL LAUNDER

[75] Inventors: Patrick P. C. Wai; Steven Rogers, both of Banbury, England

[73] Assignee: Alcan International Limited, Quebec, Canada

[21] Appl. No.: 187,270

[22] Filed: Apr. 28, 1988

[30] Foreign Application Priority Data

Apr. 28, 1987 [GB] United Kingdom ................ 8709999

[51] Int. Cl.$^4$ .......................... C22B 9/00; C22B 21/00
[52] U.S. Cl. .................................... 75/93 R; 75/68 R
[58] Field of Search .............................. 75/93 R, 68 R

[56] References Cited

U.S. PATENT DOCUMENTS

| | | | |
|---|---|---|---|
| 3,839,019 | 8/1974 | Bruno et al. | 75/68 R |
| 4,007,923 | 10/1977 | Chia | 75/68 R |
| 4,067,731 | 4/1977 | Chia | 75/68 R |
| 4,372,542 | 2/1983 | Chia | 75/93 R |
| 4,427,185 | 8/1984 | Meyer | 75/68 R |
| 4,456,231 | 6/1984 | Bergsoe | 75/93 R |
| 4,484,730 | 11/1984 | Dimitrov | 266/229 |
| A8,300,508 | 2/1983 | Ho Yu | 75/68 R |

FOREIGN PATENT DOCUMENTS

| | | |
|---|---|---|
| 0042196 | 10/1981 | European Pat. Off. . |
| 1065806 | 12/1966 | United Kingdom . |
| 1303885 | 7/1973 | United Kingdom . |
| 1565911 | 9/1980 | United Kingdom . |

Primary Examiner—Peter D. Rosenberg
Attorney, Agent, or Firm—Browdy and Neimark

[57] ABSTRACT

A method of controlling the movement of particles entrained in a liquid metal flowing along a confined flow path having a substantially horizontal base characterized by the steps of:

(1) disposing a first planar device within the flow path to cause the shedding of vortices downstream of the device so that particles having a predetermined range of terminal velocities are trapped within the vortices and agglomerated into clusters of particles.

(2) causing the agglomerated particles to be sedimented either upwardly or downwardly and (3) establishing a flow pattern downstream of the first device in which the local Reynolds number decays to a value sufficiently lower than $10^3$ to result in essentially laminar flow of the metal so as to minimize re-entrainment and subsequent break up of the agglomerated particles.

4 Claims, 7 Drawing Sheets

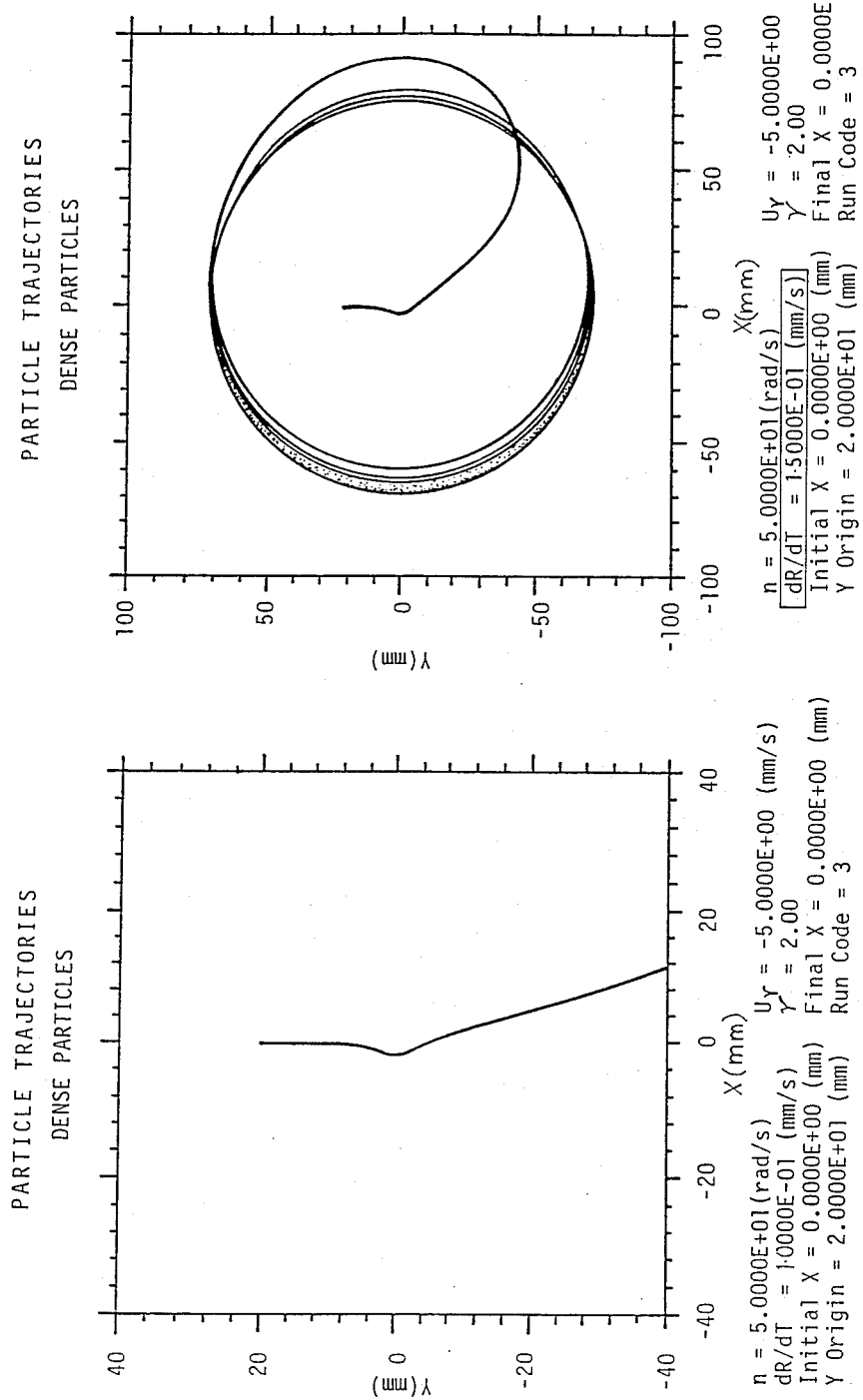

PARTICLE TRAJECTORIES
DENSE PARTICLES n = 5.0000E+01 (rad/s)    $U_\gamma$ = -5.0000E+00 (mm/s)
dR/dT = 5.0000E-01 (mm/s)    $\gamma$ = 2.00
Initial X = 0.0000E+00 (mm)    Final X = 0.0000E+00 (mm)
Y Origin = 2.0000E+01 (mm)    Run Code = 3

LIQUID METAL LAUNDER

FIELD OF THE INVENTION

This invention relates to a method of controlling the movement of particles along the flow path of liquid metal within a launder and to a launder. In this specification the term "particles" is to be understood as including solid inclusion particles; liquid inclusion particles and gas bubbles.

DESCRIPTION OF THE PRIOR ART

In the treatment of liquid aluminium alloys the melt is often left to settle prior to casting in order to sediment solid inclusion particles. These particles notably oxides, borides and carbides, if incorporated into the final product, may be detrimental. Furthermore, furnace fluxing practices designed to remove alkali metals from solution in the aluminium or to aid the cleaning of furnaces, often involve the sparging of chloride or fluoride containing gases throughout the metal. This can in certain circumstances, result in the formation of fine liquid aluminium chloride, magnesium chloride or aluminium oxychloride inclusions. In spite of furnace sedimentation practices, particles in the 2–200 $\mu$m size range commonly find their way into launder systems and eventually into the cast product. To overcome the problem, liquid metal is often treated to remove inclusions in-line, between the holding furnace and the casting machine using a variety of well known techniques. These techniques might include froth flotation such as employed in degassing cells in which spinning nozzles are used to disperse inert or reactive gas bubbles throughout the body of the melt. Or alternatively filtration systems such as bed filters or ceramic foam filters. In many instances inclusions in the 1–40 $\mu$m size range and occasionally particles up to 200 $\mu$m and in particular liquid inclusions are not fully removed by the treatment plant. Furthermore, it is possible in degassing cells, to produce liquid/gas bubble complexes which because of their small size and effectively small density difference to the molten metal, are difficult to sediment and floatate in the normal residence time of the molten metal in the transfer systems. In many cases the useful life of a filter is determined by the point at which it becomes blocked by incoming dirt. This is particularly true of fine filters in which cake filtration rather than depth trapping is the dominant mode of operation. Furthermore, it is well known that particles present in liquid aluminium tend to agglomerate into clusters under certain conditions of flow for example in degassing cells.

Molten metal is commonly transferred from holding furnaces to melt treatment plant such as degassers, filters and casting machines along generally rectangular sectioned or curved bottom, open launders. Typically such launders have a metal flow width of 10–30 cms and a metal depth of 10–20 cms.

Flow rates commonly vary in the range 100–500 kg/min for aluminium (and its alloys) which results in a local Reynolds number of between $10^3$ and $10^4$ based upon the hydraulic mean diameter of the trough.

It is well known that inclusion particles present in a liquid flow will interact with the flow so that, from time to time, they move with a region of the flow field or through a region of the flow field, depending upon the combined forces active upon them at any moment.

It is generally accepted that Reynolds numbers in the range $10^3$ to $10^4$ will result in complex flow structures (transitional flow) and that for fully laminar flow the Reynolds number should fall below $10^3$ and that for fully turbulent flow the Reynolds number should rise above $10^4$.

It is an object of the present invention to provide an improved method of controlling the flow of liquid metal along a launder to optimise trapping, agglomeration and sedimentation of unwanted inclusion particles. A further object is to, provide an improved launder.

SUMMARY OF THE INVENTION

According to one aspect of the present invention there is provided a method of controlling the movement of particles entrained in a liquid metal flowing along a confined flow path having a substantially horizontal base characterised by the steps of:

(1) disposing a first planar device within the flow path to cause the shedding of vortices downstream of the device so that particles having a predetermined range of terminal velocities are trapped within the vortices and agglomerated into clusters of particles.

(2) causing the agglomerated particles to be sedimented either upwardly or downwardly and (3) establishing a flow pattern downstream of the first device in which the local Reynolds number decays to a value sufficiently lower than $10^3$ to result in essentially laminar flow of the metal so as to minimise re-entrainment and subsequent break up of the agglomerated particles.

A second device or other planar barrier may be disposed at such a distance downstream of the first device that further selective deposition of said particles is induced in the vicinity thereof.

The invention also provides a launder having a confined flow path for liquid metal to be disposed with its base substantially horizontal characterised by a first planar device extending across the flow path to restrict the flow of molten metal along the flow path and a particle receptacle at a predetermined distance downstream of the first device, the arrangement causing the shedding of vortices downstream of the device so that particles having a predetermined range of terminal velocities are agglomerated into clusters of particles for deposition in the receptacle.

Preferably a second device or other planar barrier is disposed downstream of the first barrier. The second device or barrier may be porous. It can be of ceramic foam filter material having a pore size such that less than 50% of the total metal flow passes therethrough and the remainder passes thereover. Alternatively it may comprise a glass cloth mesh supported on as refractory frame.

Preferably the cross sectional area of the flow path is increased downstream of the first barrier.

DESCRIPTION OF THE DRAWINGS

The above and other aspects of the invention will now be described by way of example with reference to the accompanying drawings in which.

It is well known that an obstruction or bluff body disposed within a flowing stream may cause the shedding of vortices and the generation of downstream turbulence. It is also known that under certain conditions of turbulence, particles present in the flow will be flocculated or de-flocculated depending upon:

(a) the relative densities of the phases present,
(b) the local Reynolds number and
(c) the strength of the affinity between different particles (physico-chemical effects), What has not hitherto been known is the precise structure of the flow required to optimise these effects.

We can show, through a first mathematical model that in order to trap and agglomerate particles in a flow, the turbulence structure must consist of vortices which have a well defined strength and/or growth (decay) velocity. For example we have shown by discrete vortex modelling that inclusions having a relative density much less than the liquid metal, such as would be the case for certain liquid inclusions, gas bubbles in the flow, or complexes of gas-liquid and/or solid, will, to a greater or lesser extent be trapped by turbulent eddies in the flow.

Conversely, the trajectories of relatively dense particles in the liquid such as common solid inclusions in molten aluminium or magnesium, will only be perturbed in the vicinity of a steady vortex structure.

We have found by mathematical analysis however that such relatively dense particles will be optimally agglomerated by a growing vortex of a predetermined strength and decay rate. This means that to optimally agglomerate different particle types in the flow, different conditions of flow are required. A second mathematical model can then be used to indicate the type of planar device required to generate these vortices. The result is a design that can be adjusted according to the particular flow rate and pattern required.

We can simulate one type of agglomerating device (i.e.) a planar baffle which sheds vortices by using a water model. The water model experiments were conducted in a 10 cm×10 cm trough with a Reynolds number of $10^3$–$10^4$ before the agglomerating device and using P.V.C. particles to represent $TiB_2$.

Figure 1:
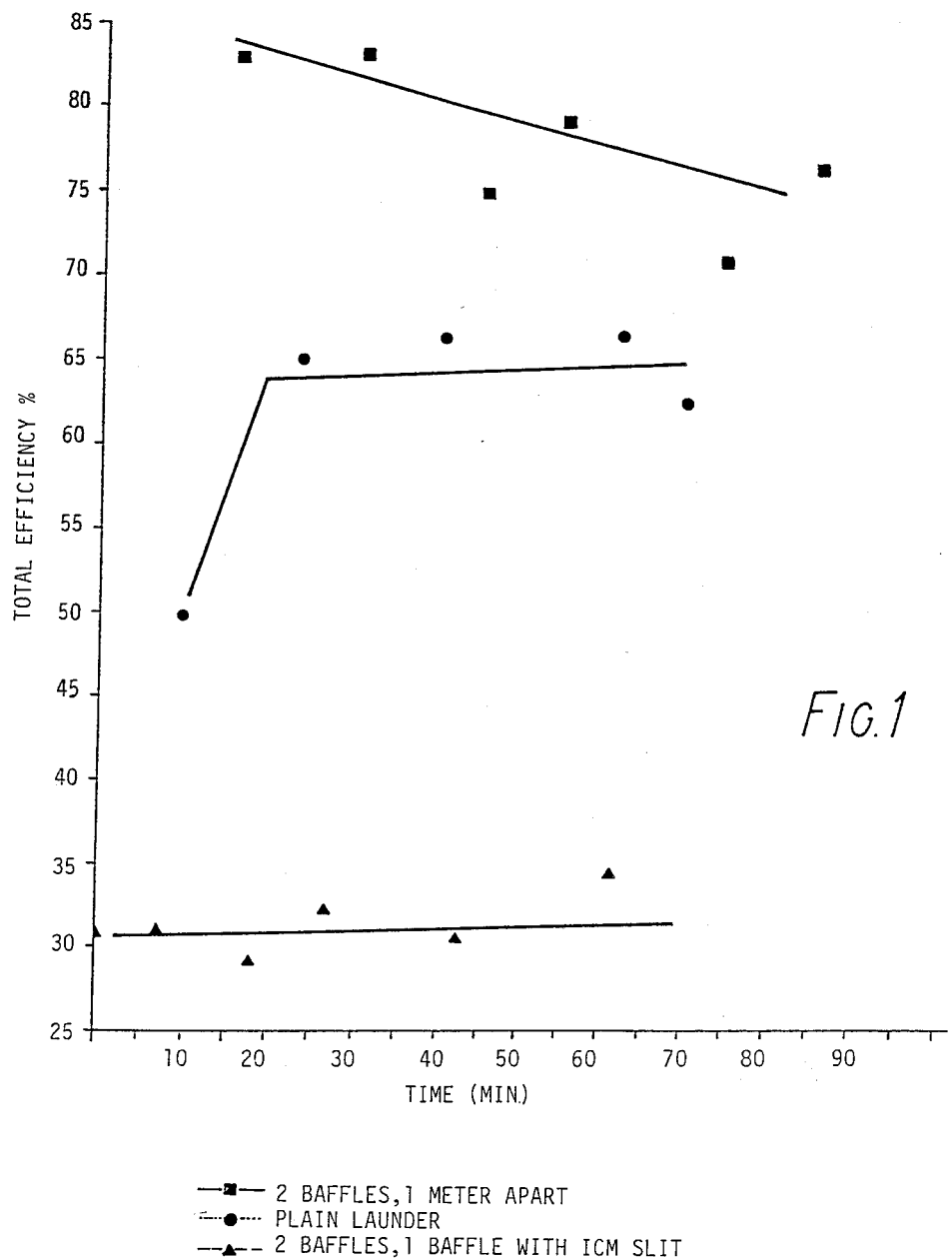
FIG. 1 is a graph illustrating results from a water model.

FIG. 1 shows the efficiency of a water model launder with and without agglomerating devices in removing PVC particles in the size range 50–100 $\mu$m. The lower curve 1a relates to a first baffle having a central vertical slit. The overall efficiency is adversely affected since non-optimum turbulent flow structure are generated. The central curve 1b relates to a plain launder with no baffles and the curve 1c relates to the provision of two baffles 1 meter apart showing significantly increased efficiency.

Figure 2:
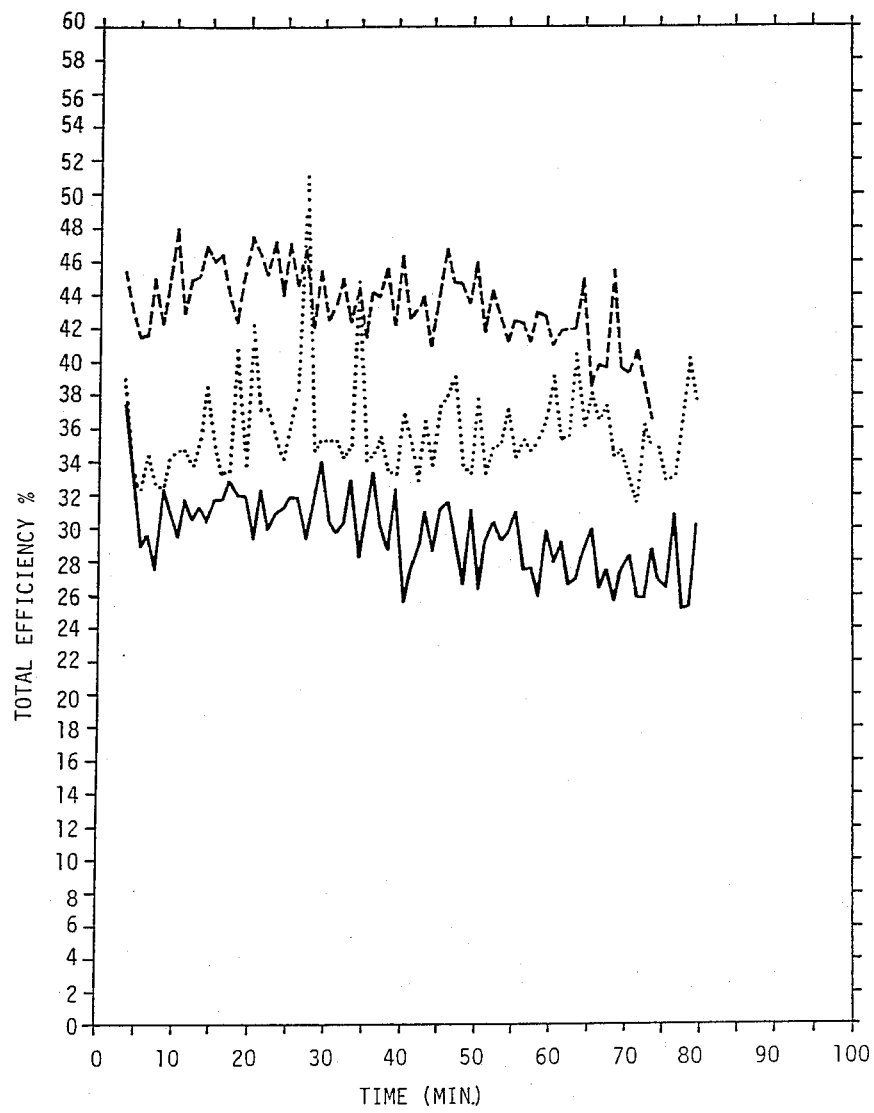
FIG. 2 is a similar graph.

FIG. 2 shows the efficiency of a similar launder, this time for removing particles in the size range 10–100 $\mu$m. Note here the improvement in efficiency when a second, porous device is provided.

We have found from such experiments that to achieve positive trapping based upon measurements of sedimented particles downstream of the device and turbidity measurements of inlet and outlet liquid, the first device, in the form of a barrier, must fractionally obstruct the flow by 0.3 to 0.7 of the cross-sectional area of the flow path; the baffle having a thickness of 2 mm to 20 mm. In a preferred arrangement the top of the baffle is castellated with regularly disposed rectangular section projections of 5 mm to 15 mm height and width and being similarly spaced apart.

Figures 3A, 3B:
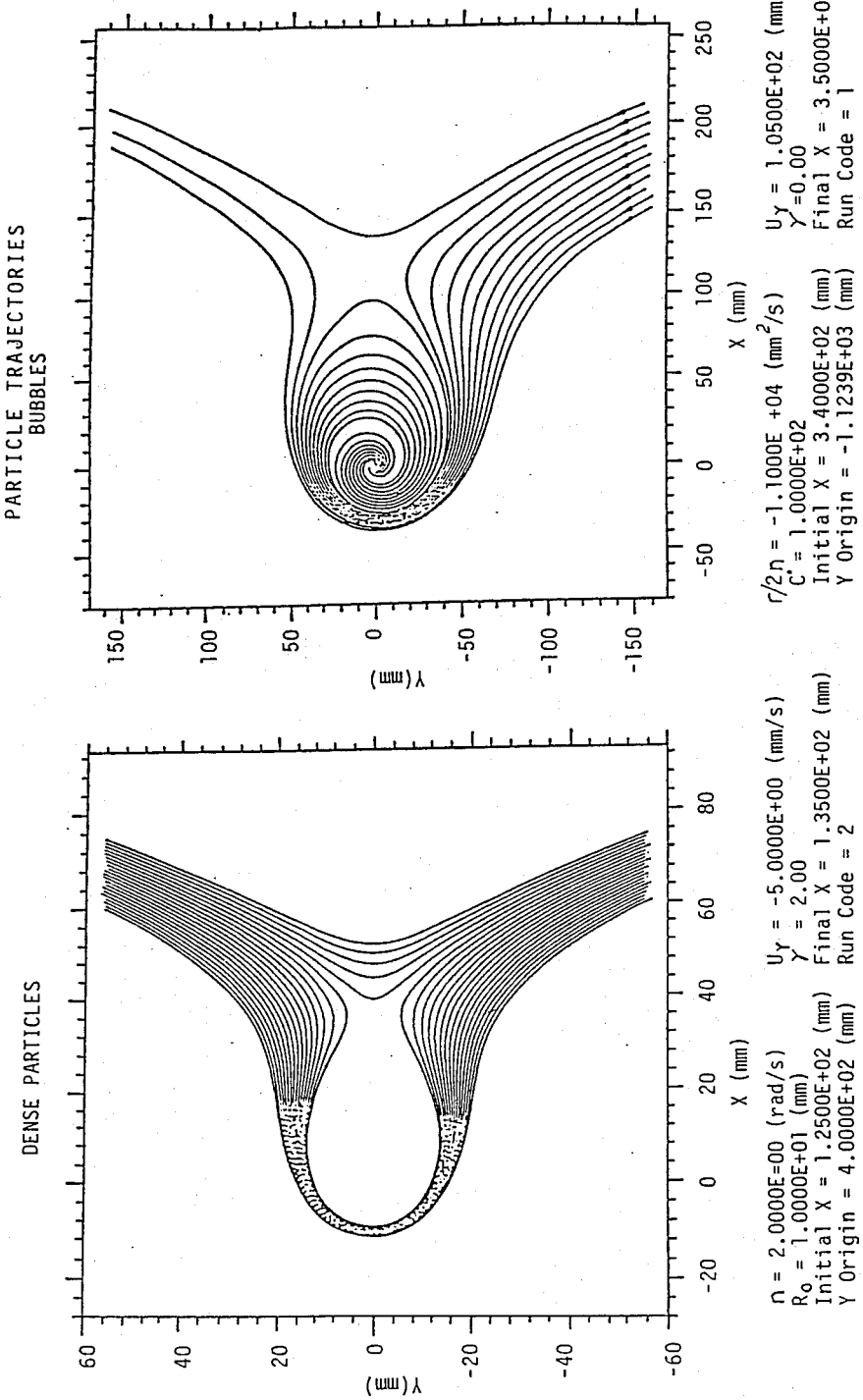
FIGS. 3 and 4 are illustrations of particle trajectories.

FIGS. 3A and 3B show the results of mathematical simulation and indicate agglomeration effects for both relatively dense 50 $\mu$m $TiB_2$ particles and relatively buoyant gas bubbles. It can be seen that in the case of bubbles (FIG. 3B) positive trapping by a vortex takes place whereas in the case of dense particles (FIG. 3A) trajectories are merely perturbed by the vortex.

It is also clear that the scale of the turbulence required to interact with the particles is different depending upon their relative density.

Figure 4C:
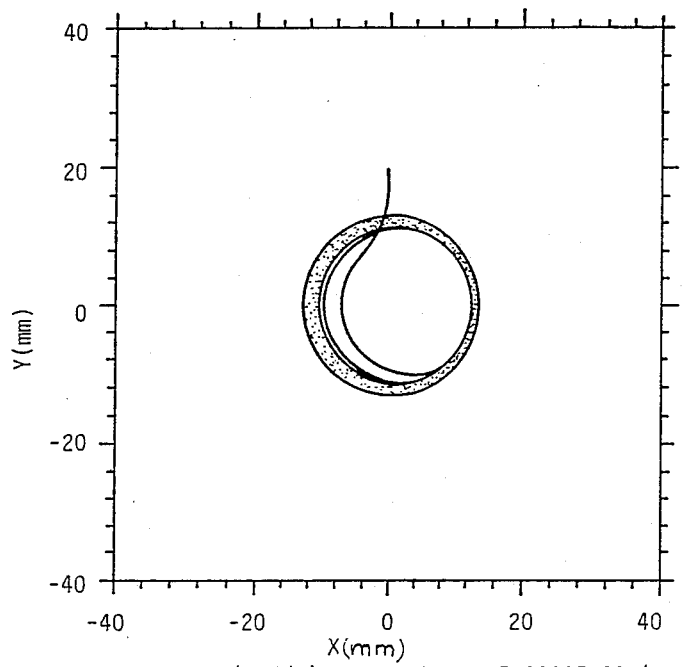

FIGS. 4A, B and C respectively show the effect of increasing vortex growth rate (dR/dT) for relatively dense 50 $\mu$m $TiB_2$ particles. FIG. 4 shows that in a launder for molten aluminium alloys, in order to trap 50 $\mu$m $TiB_2$ particles effectively it is necessary to generate vortices in the size range 2 mm to 20 mm with growth rates of not less than 0.15 mm/sec. This may be achieved by controlling the local liquid velocity, downstream of the first baffle.

Having established the design criteria for agglomeration, subsequent sedimentation and the optimum position of the second baffle is modelled using a known two phase time averaged turbulent computer code (Phoenics) to establish the local sedimentation time for given agglomerations in a given flow regime. From this it is possible to adjust the shape of the launder system to give optimum settling performance.

Figure 5:
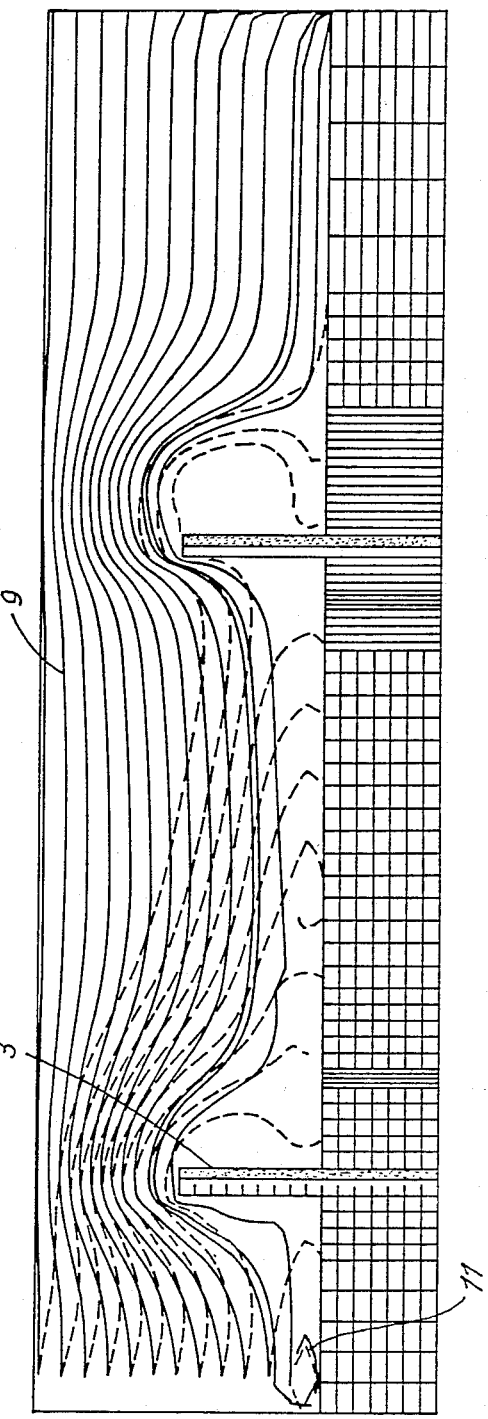
FIG. 5 is a mathematical simulation of part of a launder.

FIG. 5 shows mathematical simulation in longitudinal section of part of a launder for liquid aluminium according to the present invention, with an indication of flow patterns for the case of 50 $\mu$m $TiB_2$ particles (dashed) and fluid streamlines. However 2.0 $\mu$m particles (not shown) would be carried with the fluid streamlines. Thus 2 $\mu$m particles travel totally with the flow, whilst 50 $\mu$m particles fall through the flow.

Optimisation of the sedimentation stage can be achieved by allowing the local Reynolds number to decay to as low a value as possible, and in any case not more than $2\times10^3$ consistent with maintaining the desired vortex pattern. This can be achieved by causing the launder cross section to optionally deepen or preferably diverge, provided that such a change does not cause the molten metal to fall to too low a temperature which would be undesirable from a metal treatment and casting point of view, and also provided that such change does not cause any sudden disruption of the metal surface which might result in entrainment of surface oxide particles. In addition it is desirable that the change of shape does not cause re-entrainment of any locally depositing agglomerations.

Figure 6:
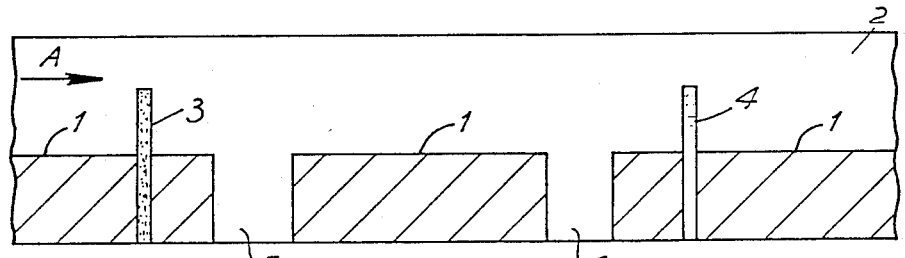
FIG. 6 is a longitudinal sectional view of a launder module.
Figure 7:
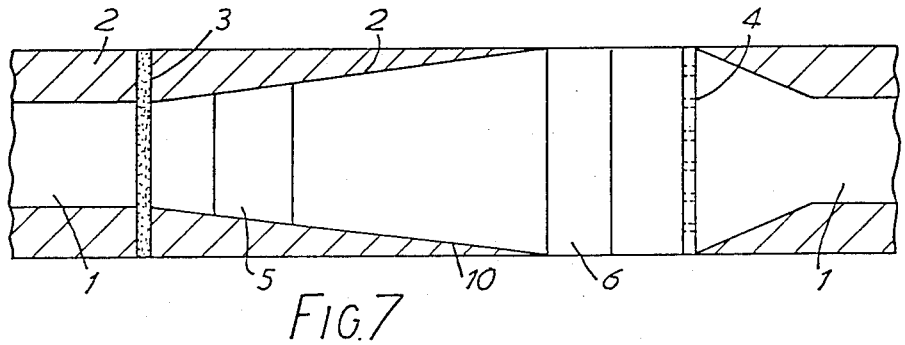
FIG. 7 is a plan view of the module of FIG. 6.

FIG. 6 shows diagrammatically in longitudinal section a launder module for liquid aluminium according to the present invention. FIG. 7 shows the same launder module in plan view. Referring to FIGS. 6 and 7, the launder has a base disposed generally horizontally and upwardly extending side walls one of which is shown at 2 - first and second baffles 3 and 4 extend across the launder and slots 5 and 6 are formed in the base 1 between the baffles. It is assumed that the liquid aluminium alloy is flowing in the direction of the arrow A and that the flow streamlines are as indicated in FIG. 5.

Laminar flow is enhanced between the baffles by causing the metal flow velocity to decrease as a result of the widening of the launder section downstream of the baffle 3 and before the slot 6. The flow channel is constrained to reconverge after the baffle 4 to re-establish initial flow conditions. A further module or modules with the same general configuration of FIGS. 6 and 7 (but possibly differing therefrom in detail) could optionally be placed at selected positions either upstream or downstream of the first module to enhance the removal of additional or other specific inclusions from the molten metal.

In a particular test arrangement baffles 3 and 4 were 5 cm high, and 1.4 m. apart. Baffle 3 is 38 cm from the entry point (not shown) of liquid metal into the launder.

The liquid metal flow, from its point of entry advances downstream with an initial velocity of 0.06 m/sec which gradually decreases as the launder bottom 1 is approached. According to FIG. 5, recirculation 11 will occur near the upstream baffle surface resulting in a tendency to trap larger inclusions. Flow is accelerated in the upper portion of the launder in order to shed vortices from the trailing edge of the baffle. As the vortices decay agglomerated inclusions fall out of the flow and are deposited in and between regions 5 and 6.

An aluminium alloy containing 0.2 wt % zirconium was melted in a 1 ton crucible induction furnace. The melt was treated in the crucible with a grain refiner by the addition of a quantity of AL-5Ti-1B master alloy prior to casting. The melt was held at the normal casting temperature being stirred continuously by the action of the induction heating system in order to maintain inclusions in suspension. A metallurgical sample was taken from the furnace and the level of solid inclusions was determined using a known pressure filtration technique. A second sample was taken immediately prior to casting and then further samples were taken during the casting operation at points before the first baffle 3 and beyond the second baffle 4. These results are shown graphically in FIG. 8.

Figure 8:
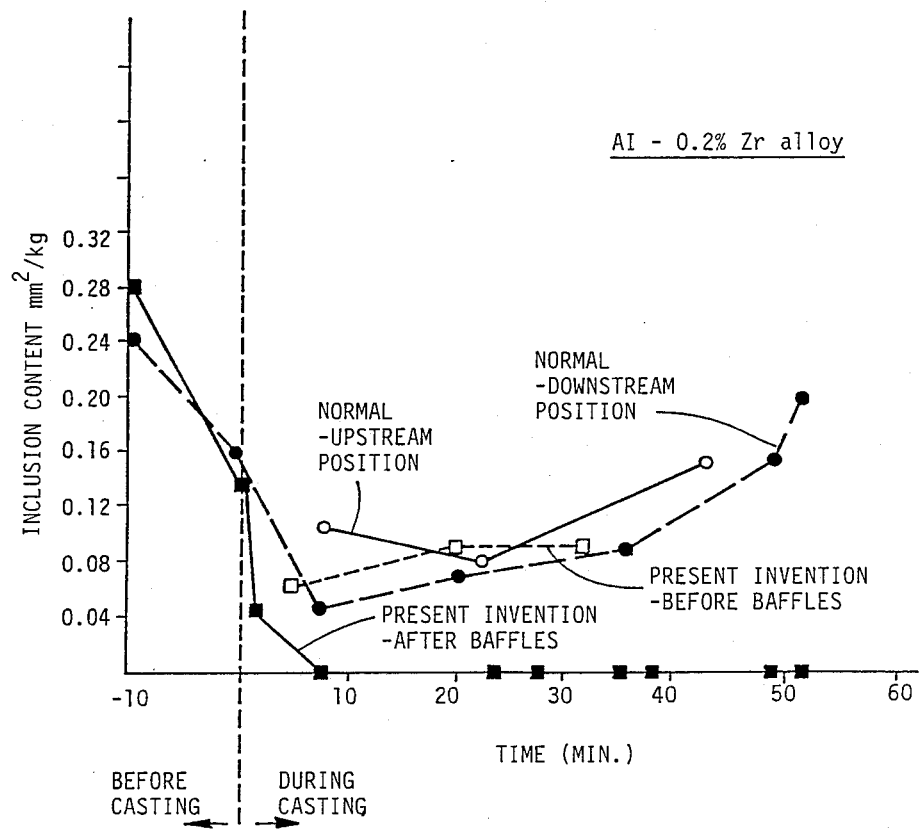
FIG. 8 is a graph showing results achieved with the launder of FIGS. 6 and 7.

By way of comparison an exactly similar charge was prepared and cast in a normal way not according to this invention. The results are also shown in FIG. 8. The normal curve gives strong indication of the presence of inclusions after the second baffle.

It will be understood that the present invention, providing an agglomerating procedure and device may be operated between the holding furnace and metal treatment plant; between metal treatment units, or between treatment plant and a casting machine, or at a number of places simultaneously.

What we claim is:

1. A method of controlling the movement of particles entrained in a liquid metal flowing along a confined flow path having a substantially horizontal base comprising the steps of:
    (1) disposing a first planar device within the flow path to cause the shedding of vortices downstream of the device so that particles having a predetermined range of terminal velocities are trapped within the vortices and agglomerated into clusters of particles.
    (2) causing the agglomerated particles to be sedimented either upwardly or downwardly and
    (3) establishing a flow pattern downstream of the first device in which the local Reynolds number decays to a value sufficiently lower than $10^3$ to result in essentially laminar flow of the metal so as to minimise re-entrainment and subsequent break up of the agglomerated particles.

2. A method according to claim 1 in which a second planar device is disposed at such a distance downstream of the first device that further selective deposition of said agglomerated particles is induced in the vicinity thereof.

3. A method according to claim 1 in which the growth rate of the vortices is controlled depending upon the density of the particles.

4. A method according to claim 3 in which the decay rate of the vortices is controlled.

* * * * *